United States Patent
Lopez

(10) Patent No.: US 10,552,901 B2
(45) Date of Patent: Feb. 4, 2020

(54) METHOD OF OPERATING AN IMAGE-BASED SELF-SERVICE CHECK DEPOSITING TERMINAL

(75) Inventor: Michael Lopez, Hamilton (CA)

(73) Assignee: NCR Corporation, Atlanta, GA (US)

(*) Notice: Subject to any disclaimer, the term of this patent is extended or adjusted under 35 U.S.C. 154(b) by 988 days.

(21) Appl. No.: 13/327,340

(22) Filed: Dec. 15, 2011

(65) Prior Publication Data

US 2013/0159183 A1 Jun. 20, 2013

(51) Int. Cl.
G06Q 40/02 (2012.01)

(52) U.S. Cl.
CPC .................................... G06Q 40/02 (2013.01)

(58) Field of Classification Search
CPC ... G06Q 20/042; G06Q 20/1085; G06Q 20/42
USPC ........................................................... 705/43
See application file for complete search history.

(56) References Cited

U.S. PATENT DOCUMENTS

| | | | |
|---|---|---|---|
| 7,980,460 B1* | 7/2011 | Harroff et al. | 235/379 |
| 8,060,442 B1* | 11/2011 | Hecht et al. | 705/45 |
| 2002/0152170 A1* | 10/2002 | Dutta et al. | 705/45 |
| 2003/0023555 A1* | 1/2003 | Rees | 705/44 |
| 2005/0035193 A1* | 2/2005 | Gustin et al. | 235/379 |
| 2005/0171899 A1* | 8/2005 | Dunn | G06Q 20/02 705/39 |
| 2007/0084911 A1* | 4/2007 | Crowell | 235/379 |
| 2008/0054064 A1* | 3/2008 | Page | G06Q 20/042 235/379 |
| 2010/0306111 A1* | 12/2010 | Slater | G06Q 20/04 705/45 |
| 2011/0119185 A1* | 5/2011 | Drummond | G06K 7/0004 705/43 |
| 2012/0023017 A1* | 1/2012 | Votaw et al. | 705/43 |

* cited by examiner

Primary Examiner — Cho Kwong
(74) Attorney, Agent, or Firm — Schwegman, Lundberg & Woessner

(57) ABSTRACT

A method is provided of operating an image-based self-service check depositing terminal when a customer at the terminal is conducting a check deposit transaction. A check to be deposited is received from the customer. An image capture device electronically captures check image data which is representative of an image of the check. The check image data is electronically transmitted via a first communications network to a web service provider to allow the web service provider to determine if the check being deposited is a duplicate check. A verification message is received from the web-based service provider indicating that the check being deposited is either a duplicate check or not a duplicate check. The check image data is transmitted via a second communications network to a consolidation server when the verification message indicates that the check being deposited in not a duplicate check.

10 Claims, 8 Drawing Sheets

METHOD OF OPERATING AN IMAGE-BASED SELF-SERVICE CHECK DEPOSITING TERMINAL

TECHNICAL FIELD

The present invention relates to check deposits, and is particularly directed to a method of operating an image-based self-service check depositing terminal, such as an image-based check depositing automated teller machine (ATM), to detect a duplicate check deposit.

BACKGROUND

A typical image-based check depositing ATM captures check image data which is representative of checks deposited at the ATM. When depositors deposit checks at the ATM, an image capture device scans the checks and captures image data which is representative of images of the checks. The captured check image data is electronically sent to a back office facility for further processing. At a later time, checks are picked up at the ATM and physically transported via courier to a check storage facility.

Since checks can be scanned at a remote location, such as at an ATM, there is potential for check fraud when a depositor intentionally deposits a check more than once. There is also potential for a depositor to make a mistake and deposit a check more than once. It would be desirable to provide a method of detecting duplicate check deposits, especially when checks are deposited at a remote location.

SUMMARY

In accordance with one embodiment, a method is provided of operating an image-based self-service check depositing terminal to detect a duplicate check deposit when a customer at the image-based self-service check depositing terminal is conducting a check deposit transaction at the self-service check depositing terminal. A check to be deposited at the self-service check depositing terminal is received from the customer. An image capture device electronically captures check image data which is representative of an image of the check provided by the customer at the self-service terminal. The check image data is electronically transmitted via a first communications network to a web service provider to allow the web service provider to determine if the check being deposited is a duplicate check. A verification message is received from the web-based service provider indicating that the check being deposited is either a duplicate check or not a duplicate check. The check image data is transmitting via a second communications network to a consolidation server when the verification message indicates that the check being deposited at the self-service check deposit terminal is not a duplicate check.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

The present invention is directed to a method of operating an image-based self-service check depositing terminal to detect a duplicate check deposit. The specific construction and use of the image-based self-service check depositing terminal may vary. The image-based self-service check depositing terminal may be, for example, an image-based check depositing automated teller machine (ATM).

Figure 1:
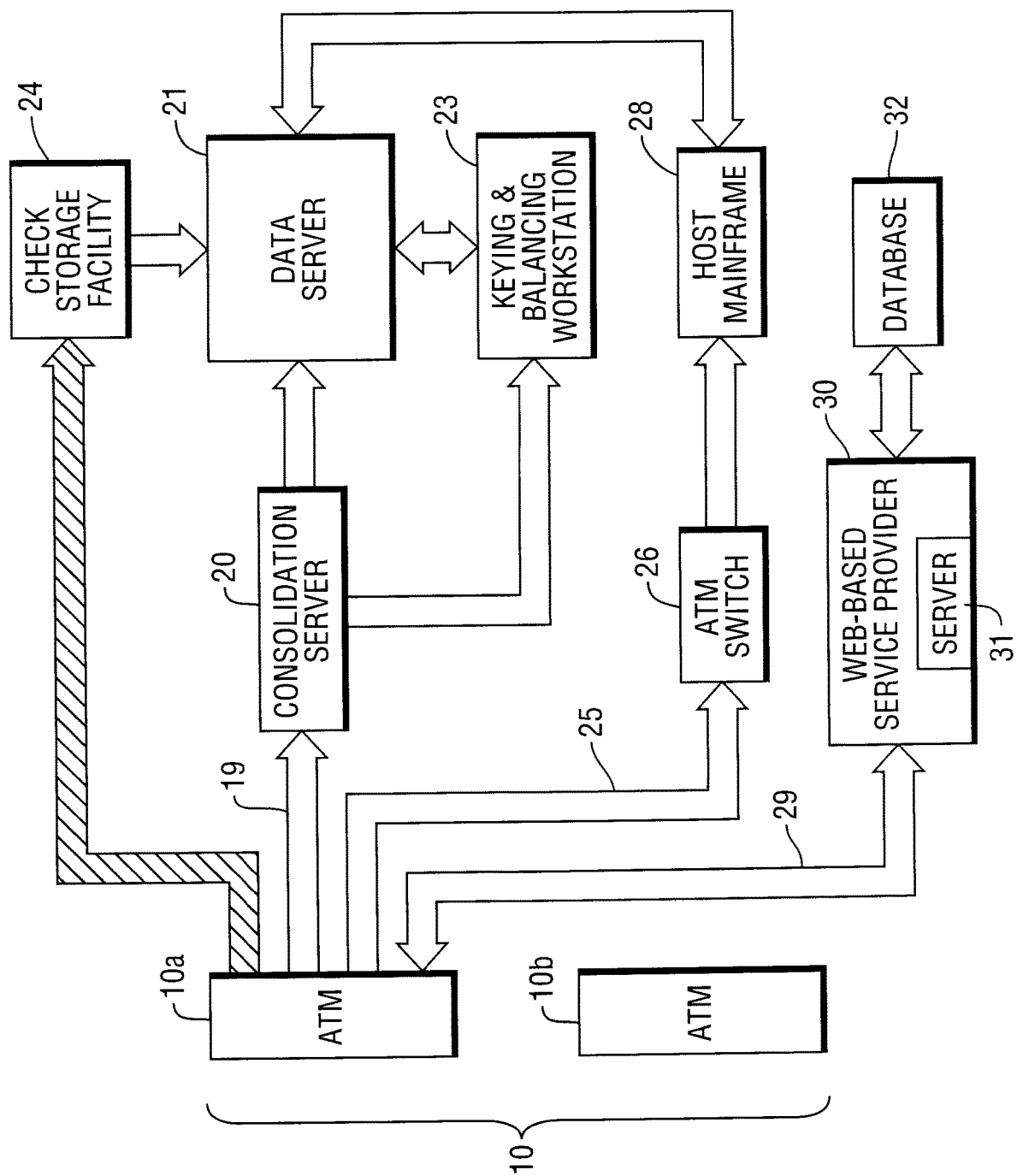
FIG. 1 is a block diagram of a networked system of image-based check depositing automated teller machines (ATMs) in accordance with one embodiment.

As shown in FIG. 1, a networked system includes a network of check depositing ATMs 10 (only two shown in FIG. 1 and designated with reference numbers "10a" and "10b"). It should be noted that unhatched arrow lines shown in FIG. 1 depict flow of electronic data, and that hatched arrow lines depict flow of physical checks. The check depositing ATMs 10 are electronically connected via a first communications network 19 through a consolidation server 20 to a data server 21.

The consolidation server 20 stages financial transaction data including check image data received from the network of ATMs 10, and then consolidates and "batches" all transaction data which has been staged. The consolidation server 20 sends the consolidated data to the data server 21 for subsequent processing at different workstations located at a back office facility of a financial institution such as a bank. Structure and operation of consolidation servers and data servers in a financial environment for receiving financial data, such as check images captured at remote locations such as ATMs, are known and, therefore, will not be described.

The consolidation server 20 is also electronically connected to a keying and balancing workstation 23 which may be located at the same facility at which the data server 21 is located. The keying and balancing workstation 23 includes an amount keying workstation, a codeline completion workstation, and a balancing workstation (all not shown). Amounts of items are keyed in at the amount keying workstation, codelines of items are completed at the codeline completion workstation, and items of transactions (i.e., credits and debits) are balanced at the balancing workstation. Structure and operation of keying and balancing workstations and different workstations within keying and balancing workstations are known and, therefore, will not be described.

A courier periodically picks up deposited checks from a storage bin in each of the ATMs 10. The checks picked up from each of the ATMs 10 are physically transported to a check storage facility 24.

When a check deposit transaction is made at an ATM (such as ATM 10a shown in FIG. 1), transaction data relating to the check deposit transaction is sent via a second communications network 25 in the form of an ATM network through an ATM switch 26 to a host mainframe 28 which is usually located at a central facility of a financial institution. The host mainframe 28 processes the transaction data in a known manner to deposit the amount of the check into the depositor's account. Structure and operation of the ATM network 25, the ATM switch 26, and the host mainframe 28, are known and conventional and, therefore, will not be described. Also, the process of the ATM 10a sending transaction data via the ATM network 25 to the ATM switch 26 to the host mainframe 28 is known and conventional and, therefore, will not be described.

Also, when a check deposit transaction is made at the ATM 10a, check image data is sent via a third communications network 29 to a web-based service provider 30. The third communications network 29 may comprise a web-based protocol, such as Simple Object Access Protocol (SOAP), to support exchange of structured information on the network 29. SOAP may use EXtensible Markup Language (XML) for its message format. Specifications for SOAP architecture and specifications for XML are known and, therefore, will not be described.

The web-based service provider 30 includes a web-based server 31 which communicates with a database 32. The database 32 stores financial transaction data including check image data which is representative of checks which have been previously deposited. The database 32 may comprise an XML database. The web-based service provider 30 may be associated with a financial institution such as a bank, or may be a third party vendor supplying services to a financial institution. The web-based service provider 30 operates to detect duplicate check deposits made at remote locations (such as at any of the ATMs 10 shown in FIG. 1), as will be described in detail later hereinbelow.

Each of the check depositing ATMs 10a, 10b has similar construction and operation. For simplicity, only the check depositing ATM 10a will be described in detail hereinbelow.

Figure 2:
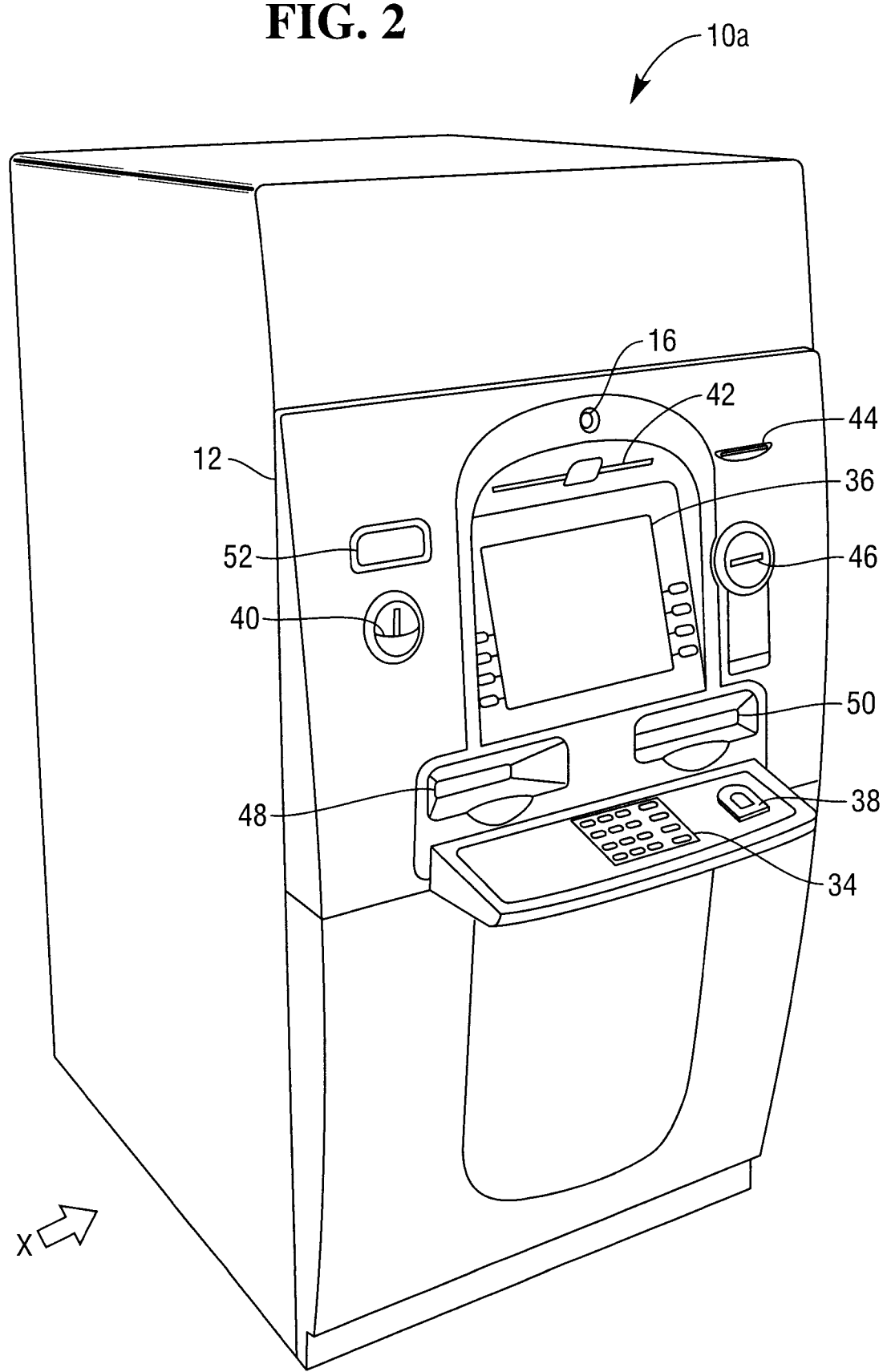
FIG. 2 is a pictorial diagram of one of the image-based check depositing ATMs of FIG. 1 in accordance with one embodiment.

Referring to FIG. 2, the check depositing ATM 10a comprises a fascia 12 coupled to a chassis (not shown). The fascia 12 defines an aperture 16 through which a camera (not shown) images a customer of the ATM 10a. The fascia 12 also defines a number of slots for receiving and dispensing media items, and a tray 40 into which coins can be dispensed. The slots include a statement output slot 42, a receipt slot 44, a card reader slot 46, a cash slot 48, another cash slot 50, and a check input/output slot 52. The slots 42 to 52 and tray 40 are arranged such that the slots and tray align with corresponding ATM modules mounted within the chassis of the ATM 10a.

The fascia 12 provides a user interface for allowing an ATM customer to execute a transaction. The fascia 12 includes an encrypting keyboard 34 for allowing an ATM customer to enter transaction details. A display 36 is provided for presenting screens to an ATM customer. A fingerprint reader 38 is provided for reading a fingerprint of an ATM customer to identify the ATM customer. The user interface features described above are all provided on an NCR SelfServ 32 (trademark) ATM, available from NCR Corporation located in Duluth, Ga. USA.

Figure 3:
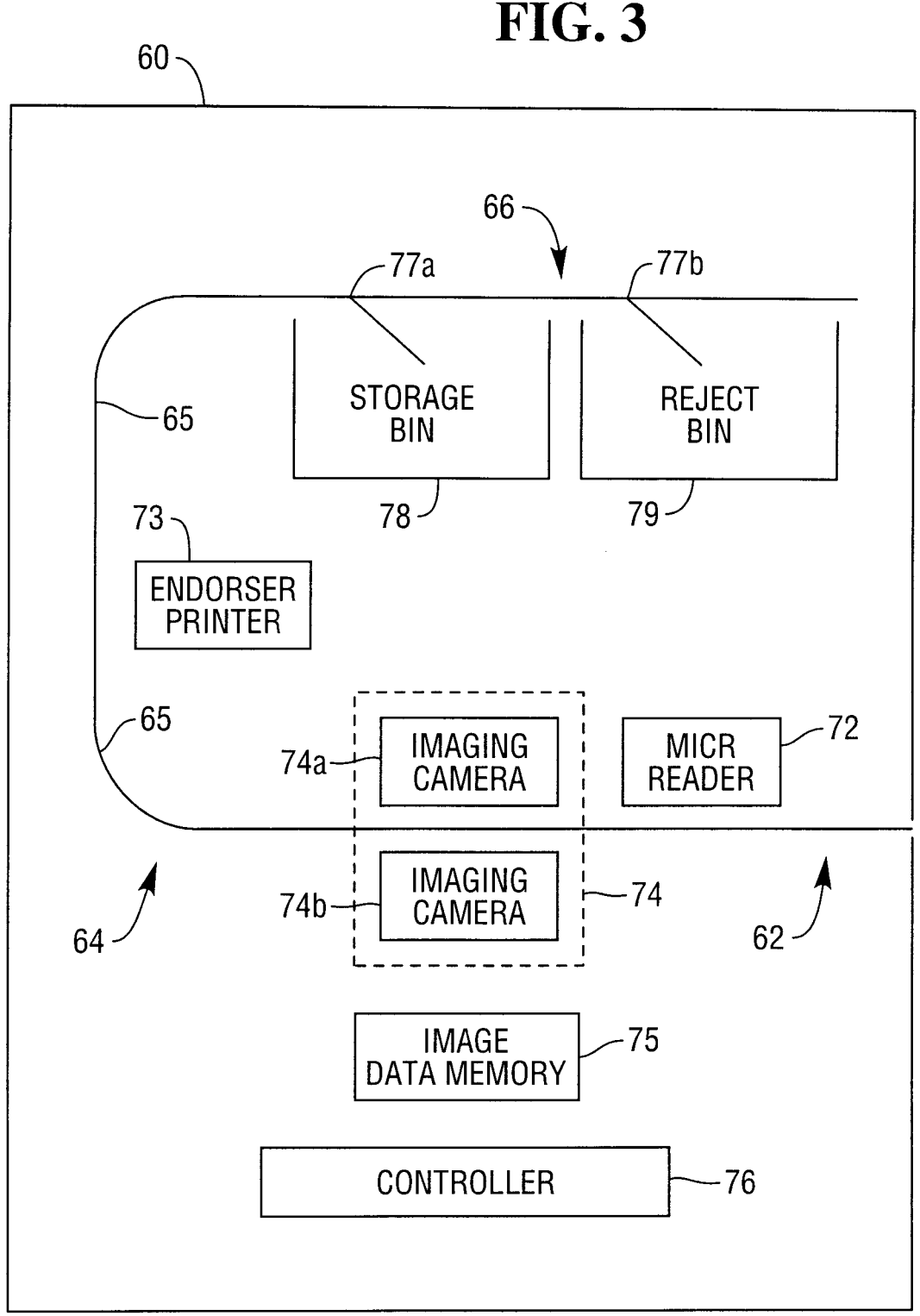
FIG. 3 is a simplified schematic diagram of a part (a check processing module) of the ATM of FIG. 2.
Figure 4:
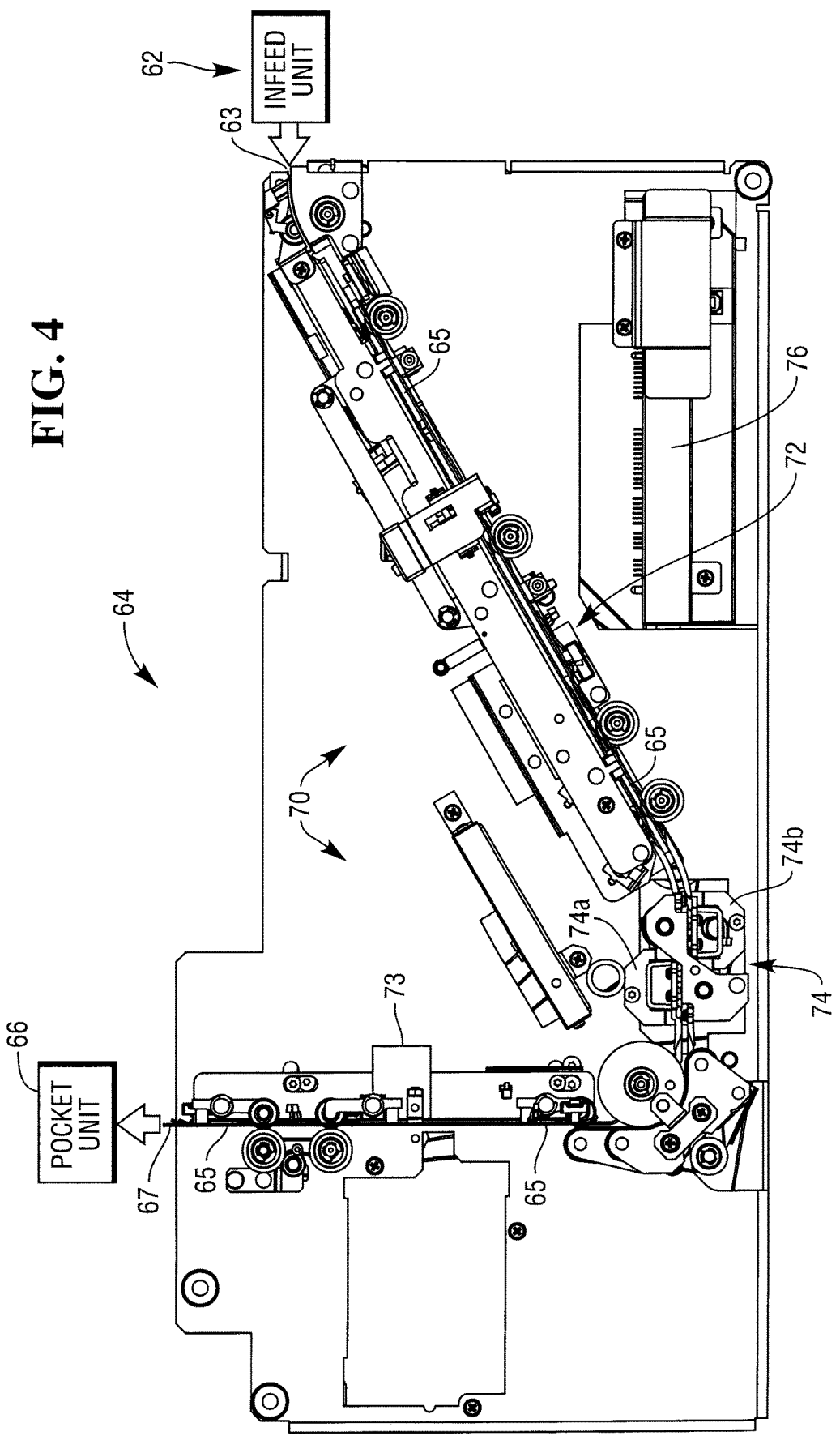
FIG. 4 is an elevational view of the check processing module of FIG. 3, looking approximately in the direction of arrow X in FIG. 2, and showing some parts removed and some parts only schematically.

A check processing module (CPM) 60 will now be described with reference to FIG. 3 and FIG. 4. FIG. 3 is a simplified schematic diagram of part of the fascia 12 and main parts of the CPM 60. FIG. 4 is an elevational view of the check processing module of FIG. 3, looking approximately in the direction of arrow X in FIG. 2, and showing some parts removed and some parts only schematically. The CPM 60 is a modified version of a conventional check processing module, such as a check processing module provided with the NCR SelfServ 32 (trademark) ATM.

The CPM 60 comprises three main units which includes an infeed unit 62, a transport unit 64, and a pocket unit 66. The infeed unit 62 receives a check which has been deposited into the check input/output slot 42, and transports the check to an inlet 63 (FIG. 4) of the transport unit 64. The dimensions of the infeed unit 62, such as its run length, may vary depending upon the particular model ATM the CPM 60 is installed. Structure and operation of the infeed unit 62 are conventional and known and, therefore, will not be described.

The transport unit 64 includes a check input/output transport mechanism 70 which includes an alignment mechanism for aligning a check. The transport mechanism 70 receives a check from the inlet 63, and transports the check along a document track 65 to an outlet 67 of the transport unit 64. The transport unit 64 further includes a magnetic ink character recognition (MICR) head 72 for reading magnetic details on a code line of a check. The transport unit 64 also includes an imager 74 including an upper 74a and lower 74b imaging camera for capturing an image of each side of a check (front and rear). An endorser printer 73 is provided for printing endorsements onto checks. An image data memory 75 is provided for storing images of checks. A controller 76 is provided for controlling the operation of the elements within the CPM 60.

The pocket unit 66 includes a storage bin 78 for storing processed checks. The pocket unit 66 further includes a reject bin 79 for storing rejected checks. Two divert gates 77a, 77b are provided for diverting checks to either the storage bin 78 or the reject bin 79. Structure and operation of the pocket unit 66 are conventional and known and, therefore, will not be described.

Figure 5:
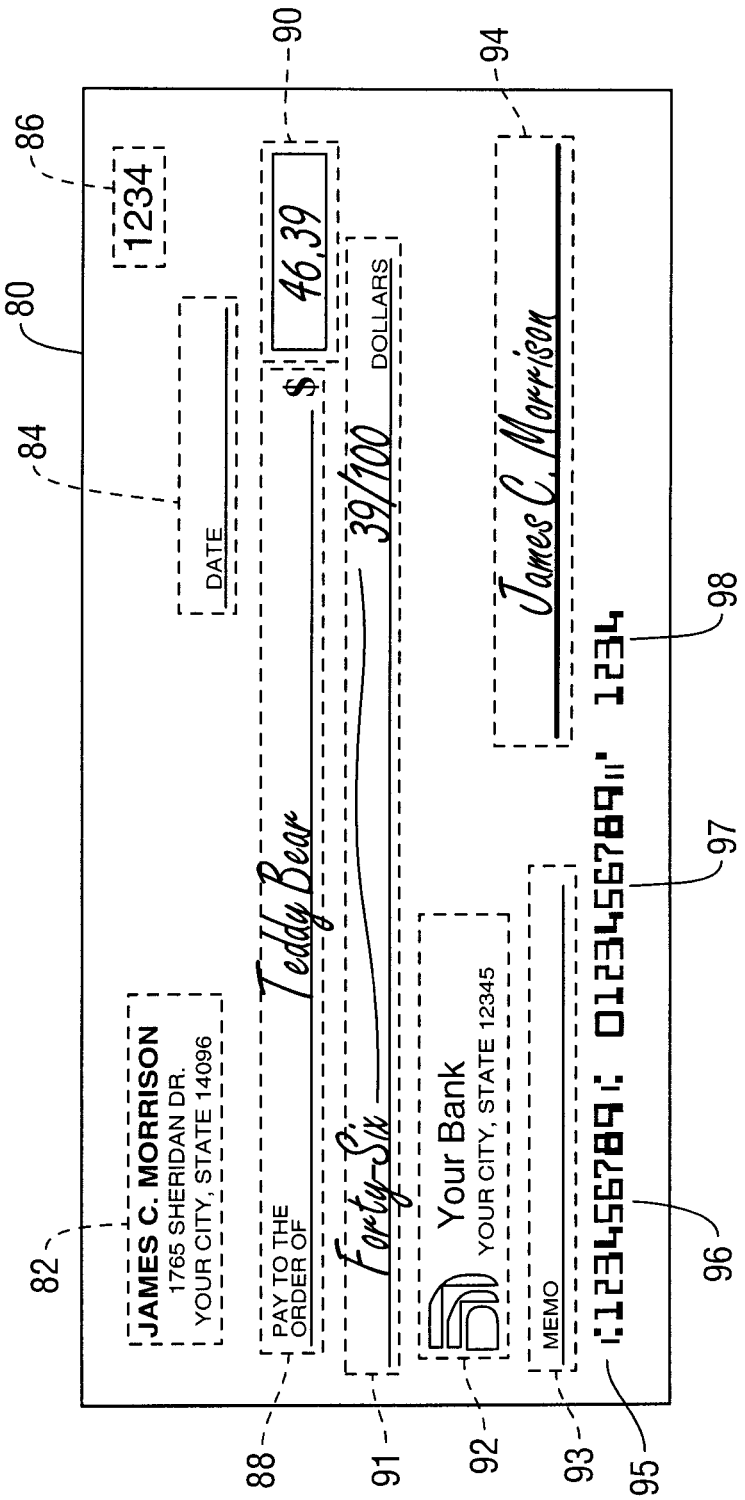
FIG. 5 is an image of a check which can be deposited at the ATM of FIG. 2.

Referring to FIG. 5, a typical check 80 of the personal type is illustrated. The check 80 is made of sheet material and includes a payer field 82, a date field 84, a check number field 86 located in the upper-right corner of the check, and a payee field 88. The check 80 also includes a courtesy amount field 90, a legal amount field 91, a paying bank name field 92, a memo field 93, and a payer signature field 94. Each field of the check 60 contains pre-printed information therein, such as shown in FIG. 5. The check 80 has a MICR codeline 95 which comprises a routing/transit number 96, an account number 97, and a check number 98. Format of the routing/transit number 96, the account number 97, and the check number 98 are conventional and known in the financial industry.

Figure 6A:
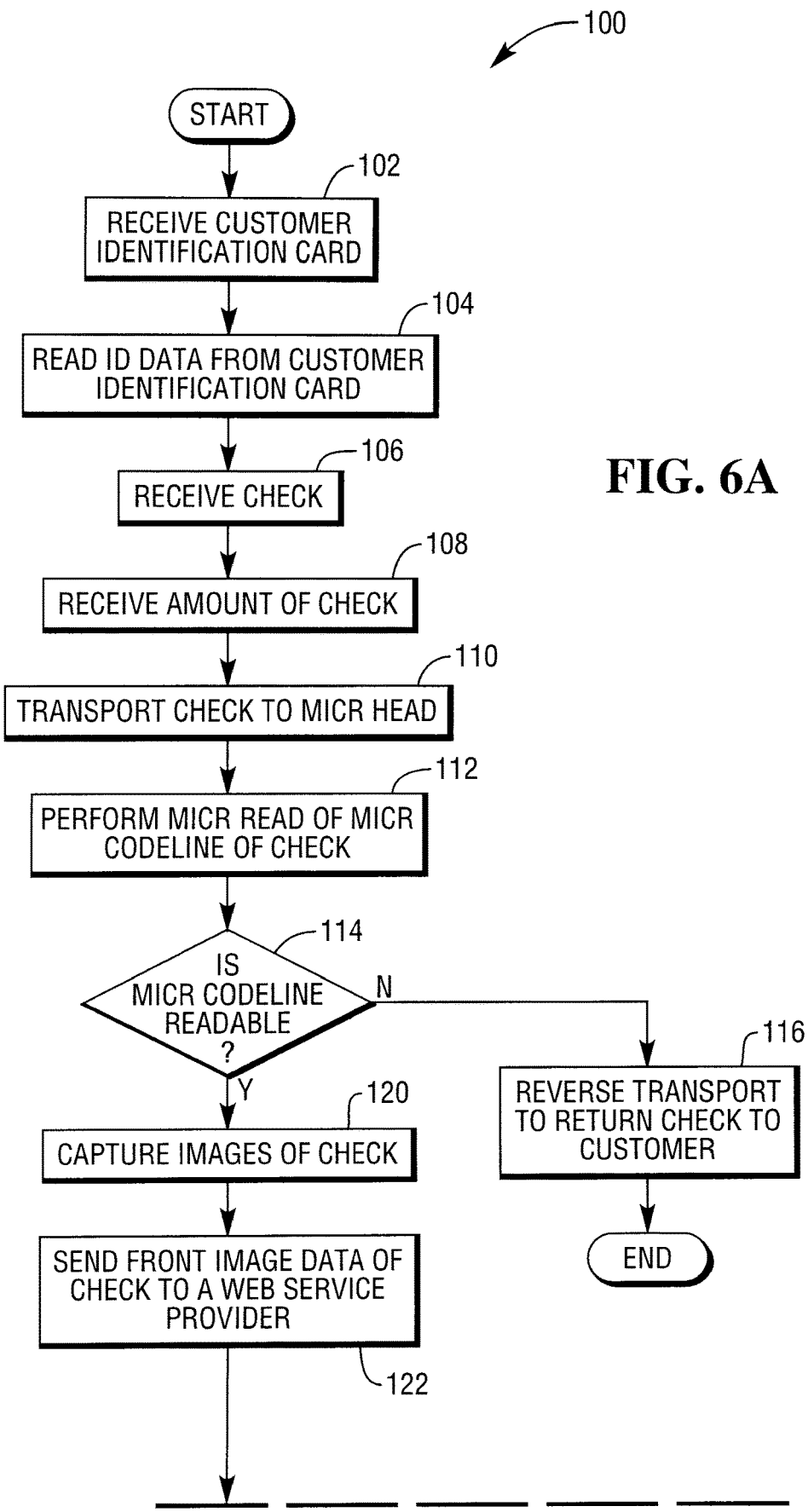
FIG. 6 is a flowchart illustrating steps involved in a check depositing operation in accordance with one embodiment.
Figure 6B:
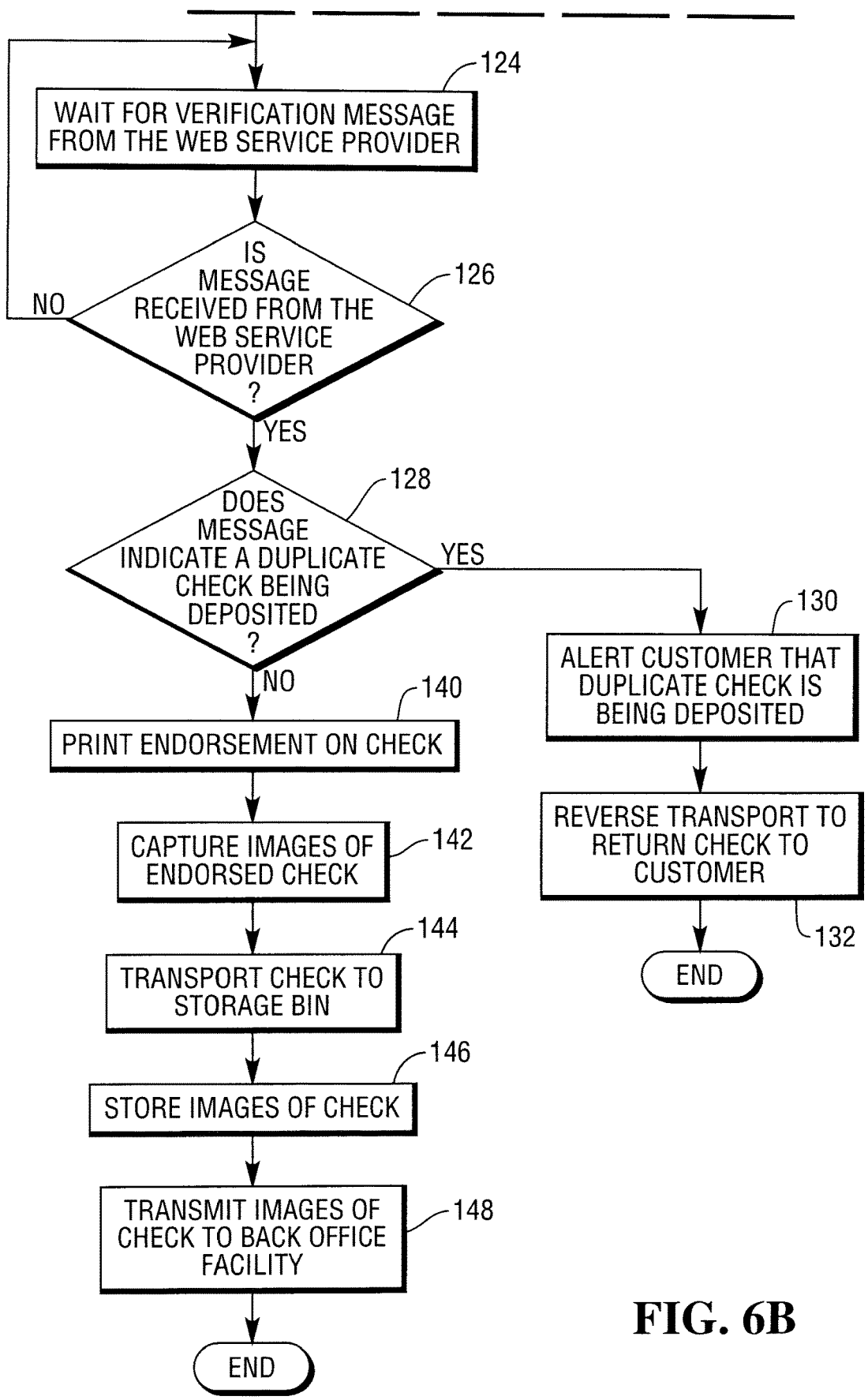

Referring to FIG. 6, a flowchart 100 depicts a check depositing transaction in accordance with one embodiment. With reference to FIG. 6 and also to FIGS. 2 to 4, a check depositing transaction carried out at the ATM 10a is described. In the check depositing transaction, an ATM customer enters a customer identification card into the card reader slot 46 (steps 102 and 104), selects "check depositing" from a list of transaction options presented on the display 36, enters the amount of the check 80 via the keyboard 34, and inserts the check to be deposited through the check input/output slot 52 (step 106). The controller 76 receives the amount of the check 80 (step 108), and opens a slot entrance shutter located at the infeed unit 62. The transport mechanism 70 receives the check 80 and transports the received check (step 110) to the MICR head 72 where the MICR codeline 95 on the check is read (step 112).

A determination is made (step 114) as to whether the MICR codeline 95 can be read from the check 80. If MICR codeline data from the check is unreadable as determined in step 114, then a check return operation is initiated. When this occurs, the transport mechanism 70 reverses the direction of transport (step 116) to convey the check 80 to the check input/output slot 52 to return the check to the ATM customer via the check input/output slot. However, if MICR codeline data from the check 80 is readable as determined in step 114, then the transport mechanism 70 transports the check to the imager 74, where both sides of the check are imaged (step 120). The process proceeds to step 122.

In step 122, check image data associated with front of the check 80 is electronically transmitted via the third communications network 29 to the web-based service provider 30. If SOAP is the protocol used for the third communications network 29, then check image data associated with front of the check 80 is sent as a document in XML format to the web-based service provider 30 (step 122). The controller 76 of the ATM 10a then waits for a verification message from the web-based service provider 30 (step 124).

The web-based service provider 30 processes the XML document received from the ATM 10a in a manner to be described in detail later. The web-based service provider 30 also generates a verification message, and sends the verification message to the ATM 10a in a manner to be described in detail later.

The controller 76 continues to wait for a verification message from the web-based service provider 30 (steps 124 and 126). When the controller 76 receives a verification message from the web-based service provider 30, a determination is made as to whether the verification message indicates the check 80 which is attempted to be deposited by the ATM customer at the ATM 10a is a duplicate check (step 128). If the determination in step 128 is affirmative (i.e., the check 80 being deposited is determined to be a duplicate check), then the ATM customer is alerted that a duplicate check is being deposited (step 130). The alert may be presented in the form of a text message or a video message appearing on the display 36 of the ATM 10a. The transport mechanism 70 of the ATM 10a is reversed to convey the check 80 to the check input/output slot 52 to return the check to the ATM customer (step 132).

However, if the determination made back in step 128 is negative (i.e., the check 80 being deposited is determined to not be a duplicate check), then the process proceeds to step 140. In step 140, the endorser printer 73 prints endorsement data onto the check 80. The endorsed check may optionally be transported back to the imager 74 to image the endorsed check (step 142). The endorsed check is then transported to the storage bin 78 (step 144) for subsequent collection and further processing.

Captured images of the check 80 are stored in the image data memory 75 (step 146). The check images may be stored locally to the ATM 10a. For example, the check images may be stored on an ATM hard drive located within the ATM 10 for a period of time determined by the financial institution. This financial institution may or may not own the particular ATM 10a at which the check 80 has been deposited. The check images are electronically transmitted to the back office facility for further processing at the back office facility (step 148).

Figure 7:
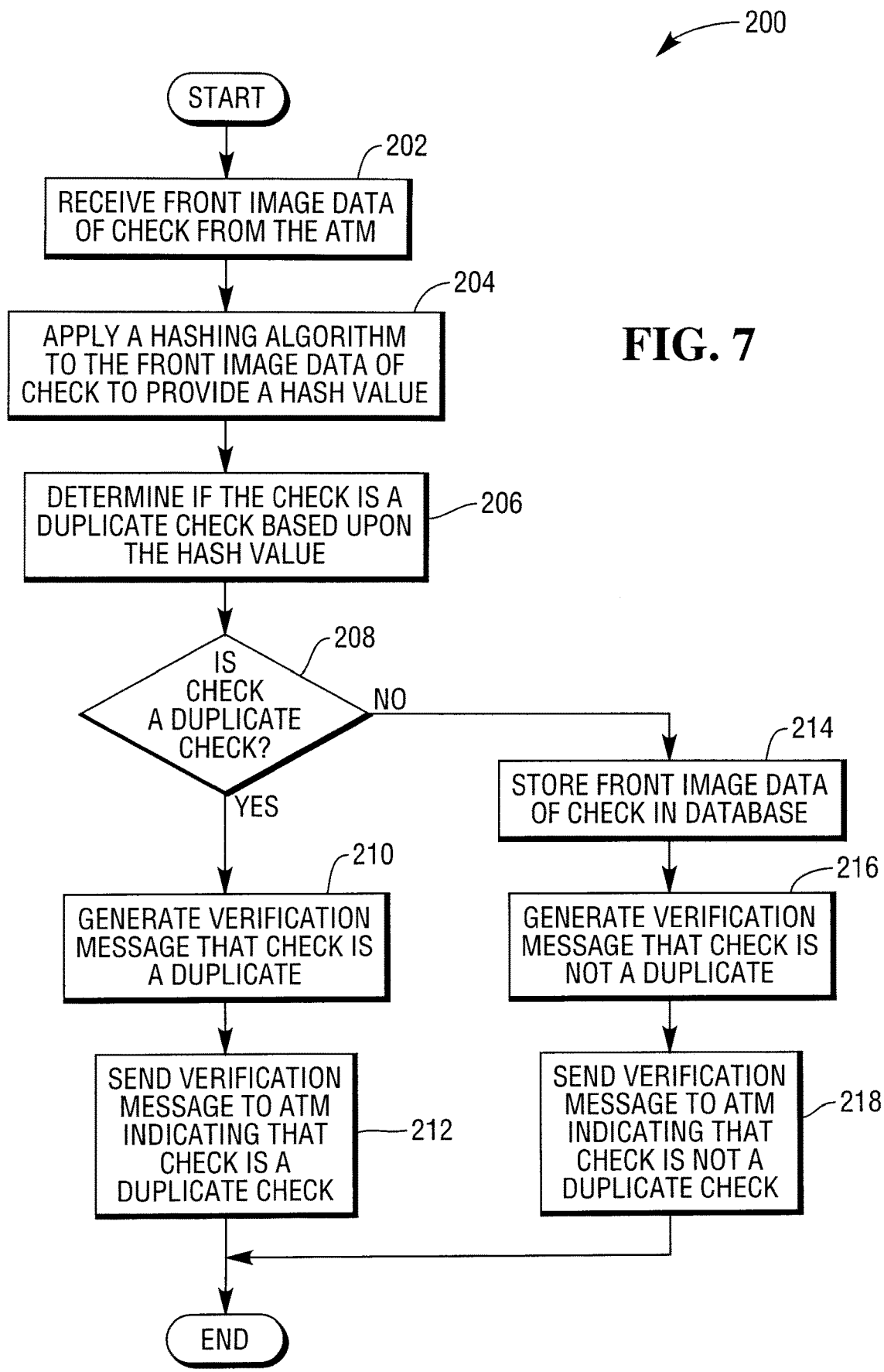
FIG. 7 is a flowchart illustrating steps involved in a verifying operation performed by a web-based service provider in accordance with one embodiment.

Referring to FIG. 7, a flowchart 200 depicts steps involved in a verifying operation performed by the web-based service provider 30 in accordance with one embodiment. When check image data of front of the check 80 is received from the ATM 10a (step 202), the server 31 of the web-based service provider 30 applies a hashing algorithm to the check image data to determine if the check 80 is a duplicate check attempted to be deposited. The hashing algorithm may be any hashing algorithm. An example hashing algorithm is disclosed in U.S. application Ser. No. 11/585,644, filed on Oct. 24, 2006, published as U.S. Publication No. US 2008/0116257 A1 on May 22, 2008, entitled "Method of Duplicate Check Detection in a Check Image Capture Application", and assigned to NCR Corporation located in Duluth, Ga., the disclosure of which is fully incorporated by reference.

A hash value is calculated based upon check image data received from the ATM 10a and data stored in the database 32 (step 204). Based upon the hash value provided by the hashing algorithm, a determination is made as to whether the check 80 is a duplicate check (steps 206 and 208). If the determination in step 208 is affirmative (i.e., the check 80 being deposited at the ATM 10a is determined to be a duplicate check), then a verification message is generated indicating that the check is a duplicate check (step 210). The verification message is then electronically transmitted to the ATM 10a to indicate that the check 80 being deposited is determined to be a duplicate check (step 212).

However, if the determination back in step 208 is negative (i.e., the check 80 being deposited at the ATM 10a is determined to not be a duplicate check), then the check image data associated with the check is stored in the database 32 to allow checks being deposited in the future to be determined if they are duplicate checks or not (step 214). A verification message is generated indicating that the check 80 being deposited at the ATM 10a is not a duplicate check (step 216). The verification message is then electronically transmitted to the ATM 10a to indicate that the check 80 being deposited is determined to not be a duplicate check (step 218).

It should be apparent that the example method described hereinabove provides a real-time, duplicate check deposit detecting feature. This feature may be implemented by an algorithm which is expressed in a computer program containing executable instructions which, when executed, carry out steps of the algorithm to provide the feature. The real-time solution allows duplicate check deposits which are being made at remote locations, such as at ATMs, to be detected before the fact and not after the fact (i.e., before a check is accepted for deposit at an ATM and before the depositor walks away from the ATM). Accordingly, duplicate check deposits as well as subsequent processing to make adjustments and corrections to a depositor's account are avoided. This results in cost savings during operation of the network of ATMs 10 shown in FIG. 1.

It should also be apparent that the example method described hereinabove is performed by a computer having a memory executing one or more programs of instructions which are tangibly embodied in a program storage medium readable by the computer. A single computer may perform the example method described hereinabove. However, it is conceivable that more than one computer perform the example method described hereinabove.

Although the above description describes the third communications network 29 as being separate from the first and second communications networks 19, 25, it is conceivable that the third communications network 29 may comprise at least some portion of either the first communications network 19 or the second communications network 25, or both. Also, although the above description describes the third communications network 29 as comprising SOAP architecture, it is conceivable that other web-based protocols may be used.

Although the above description describes the web-based service provider 30 using a specific hashing algorithm to determine whether the check 80 being deposited at the ATM 10a is a duplicate check or not, it is conceivable that other hashing algorithms may be used. Alternatively, other types of algorithms, such as non-hashing types of algorithms may be used.

Also, although the above description describes the check 80 being deposited in its entire amount by the ATM customer, it is conceivable that the check may be deposited only in partial amount of the entire amount of the check at the ATM 10a, with the remaining amount of the check being cashed and delivered to the ATM customer. Also, although the above description describes a personal check being deposited, it is conceivable a business type of check be deposited.

Further, although the above description describes an NCR SelfServ 32 (trade mark) ATM embodying the present invention, it is conceivable that other models of ATMs, other types of ATMs, or other types of self-service terminals may embody the present invention. Self-service terminals are generally public-access devices that are designed to allow a user to conduct a transaction or to access information in an unassisted manner and/or in an unattended environment. Self-service terminals typically include some form of tamper resistance so that they are inherently resilient. Self-service terminals allow users to obtain information or to conduct a transaction. Self-service terminals include: ATMs; non-cash kiosks that allow users to access information (e.g., to view reward points on a reward card the user inserts into the self-service terminal); and kiosks that accept payment for services (e.g. Web surfing kiosks, kiosks that allow users to buy goods, etc.). The term self-service terminal has a relatively broad meaning and includes vending machines. Accordingly, it is conceivable that check image data may be captured at any type of self-service terminal, such as a check depositing ATM, a check depositing/cashing ATM, a check cashing ATM, or the like, which has check-imaging capability.

While the present invention has been illustrated by the description of example processes and system components, and while the various processes and components have been described in detail, applicant does not intend to restrict or in any limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method of operating an image-based self-service check depositing terminal to detect a duplicate check deposit while a customer at the image-based self-service check depositing terminal (SST) is conducting a check deposit transaction at the SST, the method comprising:
   receiving, by the SST, a check being deposited by the customer at the SST;
   electronically by an image capture device integrated into the SST, capturing check image data which is representative of an image of the check being deposited by the customer at the SST;
   electronically transmitting by the SST and via a first type of communications network the check image data to a web service provider over a web-compatible network representing the first type of communications network, the web service provider determining that the check being deposited by the customer at the SST is not a duplicate check;
   receiving, by the SST, from the web-based service provider a verification message over the web-compatible network indicating that the check being deposited by the customer at the SST is not the duplicate check;
   presenting, by the SST, a video message on a display of the SST when the verification message indicates that the check being deposited by the customer at the SST is a duplicate check and reversing a check transport mechanism within the SST to convey the check to the check input/output slot to return the check back to the customer at the SST;
   transmitting by the SST and via a second type of communications network the check image data to a consolidation server after the verification message indicates that the check being deposited by the customer at the SST is not the duplicate check and before the customer completes the check deposit transaction at the SST, wherein the second type of communications network is an Automated Teller Machine (ATM) network, wherein transmitting further includes printing, by the SST, endorsement data onto the check when the check is not the duplicate check and providing an endorsed check to the image capture device that takes a second image of the endorsed check and moving the endorsed check to a storage bin within the SST; and
   processing, by the SST, the method in real-time for the customer while the customer remains at the SST.

2. A method according to claim 1, wherein the first type of communications network and the second type of communications network are different types of communications networks and are separate from each other.

3. A method according to claim 1, wherein the verification message comprises an EXtensible Markup Language (XML) document.

4. A method according to claim 1, wherein the method is performed by a computer having a memory executing one or more programs of instructions which are tangibly embodied in a program storage medium readable by the computer.

5. A method of operating an image-based check depositing automated teller machine (ATM) to detect a duplicate check deposit while an ATM customer at the ATM is conducting a check deposit transaction at the ATM, the method comprising:
   receiving, by the ATM, a check being deposited by the ATM customer at the ATM;
   electronically by an image capture device integrated into the ATM, capturing check image data which is representative of an image of the check being deposited by the ATM customer at the ATM;
   electronically transmitting by the ATM and via a first type of communications network the check image data to a web service provider over a web-compatible network representing the first type of communications network, the web service provider determining that the check being deposited by the ATM customer at the ATM is not a duplicate check;
   receiving, by the ATM, from the web-based service provider a verification message indicating that the check being deposited by the ATM customer at the ATM is not the duplicate check over the web-compatible network;
   presenting, by the ATM, a video message on a display of the ATM when the verification message indicates that the check being deposited by the customer at the ATM is a duplicate check, and reversing a check transport mechanism within the ATM to convey the check to the check input/output slot to return the check back to the customer at the ATM;

transmitting by the ATM and via a second type of communications network the check image data to a consolidation server after the verification message indicates that the check being deposited by the ATM customer at the ATM is not the duplicate check and before the ATM customer completes the check deposit transaction at the ATM, wherein the second type of communications network is an Automated Teller Machine (ATM) network, wherein transmitting further includes printing, by the ATM, endorsement data onto the check when the check is not the duplicate check and providing an endorsed check to the image capture device that takes a second image of the endorsed check and moving the endorsed check to a storage bin within the SST; and processing, by the ATM, the method in real-time for the customer while the customer remains at the ATM.

6. A method according to claim 5, wherein the first type of communications network and the second type of communications network are different types of communications networks and are separate from each other.

7. A method according to claim 5, wherein the verification message comprises an EXtensible Markup Language (XML) document.

8. A method according to claim 5, wherein the method is performed by a computer having a memory executing one or more programs of instructions which are tangibly embodied in a program storage medium readable by the computer.

9. A method of operating a web-based service provider to determine if a check being deposited by an automated teller machine (ATM) customer at an ATM is a duplicate check, the method comprising:

receiving, by a server, check image data which is representative of an image of a check being deposited by the ATM customer at the ATM over a web-compatible network;

determining, by the server, that the check image is not representative of a duplicate check being deposited by the ATM customer at the ATM, wherein determining further includes generating a hash value from the check image data and determining based on the hash value whether the check is the duplicate check;

generating, by the server, a first verification message to indicate that the check being deposited by the ATM customer at the ATM is not the duplicate check, wherein generating further includes generating the first verification message while the ATM waits on the first verification message for the check being processed by the ATM and while the customer remains at the ATM;

electronically transmitting by the server a generated verification message sent to the ATM at which the check is being deposited by the ATM customer before the ATM customer walks away from the ATM over the web-compatible network, wherein electronically transmitting further includes transmitting the generated verification message in real time to the ATM;

instructing, by the server, with generated verification message to present a video message to the customer on a display of the ATM when the check being deposited is the duplicate check that causes the ATM to reverse a check transport mechanism within the ATM to convey the check to the check input/output slot to return the check back to the customer at the ATM; and processing, by the server, the method in real time for the customer at the ATM.

10. A method according to claim 9, further comprising:

storing the check image data which has been received from the ATM in a database.

* * * * *